(12) United States Patent
Kang et al.

(10) Patent No.: US 12,397,778 B2
(45) Date of Patent: Aug. 26, 2025

(54) APPARATUS AND METHOD FOR AUTOMATIC PARKING BASED ON PARKING AREA ENVIRONMENT RECOGNITION

(71) Applicant: ELECTRONICS AND TELECOMMUNICATIONS RESEARCH INSTITUTE, Daejeon (KR)

(72) Inventors: Jung-Gyu Kang, Daejeon (KR); Dong-Jin Lee, Daejeon (KR); Kyoung-Wook Min, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 45 days.

(21) Appl. No.: 18/365,071

(22) Filed: Aug. 3, 2023

(65) Prior Publication Data
US 2024/0123973 A1    Apr. 18, 2024

(30) Foreign Application Priority Data
Oct. 13, 2022  (KR) ........................ 10-2022-0131282
May 18, 2023  (KR) ........................ 10-2023-0064191

(51) Int. Cl.
| | | |
|---|---|---|
| G08G 1/14 | (2006.01) | |
| B60W 30/06 | (2006.01) | |
| B60W 30/18 | (2012.01) | |
| G06V 10/26 | (2022.01) | |
| G06V 20/58 | (2022.01) | |

(52) U.S. Cl.
CPC ...... *B60W 30/06* (2013.01); *B60W 30/18036* (2013.01); *G06V 10/26* (2022.01); *G06V 20/586* (2022.01); *B60W 2554/20* (2020.02)

(58) Field of Classification Search
CPC .......... B60W 30/06; B60W 30/18036; B60W 2554/20; B60W 2720/24; G06V 10/26; G06V 20/586
USPC ................. 340/932.2, 933, 937, 988, 995.28
See application file for complete search history.

(56) References Cited

U.S. PATENT DOCUMENTS

| | | | | |
|---|---|---|---|---|
| 11,691,619 B2 * | 7/2023 | Kim | ..................... | G06V 20/586 701/41 |
| 2016/0307052 A1 * | 10/2016 | Han | ..................... | G06V 20/588 |
| 2019/0276011 A1 * | 9/2019 | Eshima | .............. | B62D 15/0285 |

(Continued)

FOREIGN PATENT DOCUMENTS

| | | |
|---|---|---|
| CN | 109677398 | 4/2019 |
| JP | 4078948 | 4/2008 |

(Continued)

*Primary Examiner* — Anh V La
(74) *Attorney, Agent, or Firm* — KILE PARK REED & HOUTTEMAN PLLC (57) ABSTRACT

Disclosed herein are an apparatus and method for automatic parking based on recognition of a parking area environment. The method may include searching for an available parking space, determining whether reverse parking is possible by recognizing the environment of the available parking space, recognizing at least one additional vehicle located in the vicinity of the available parking space, and setting a parking destination based on the determination of whether reverse parking is possible and the result of recognition of the at least one additional vehicle.

15 Claims, 11 Drawing Sheets

(56) References Cited

U.S. PATENT DOCUMENTS

| | | | |
|---|---|---|---|
| 2020/0005649 A1 | 1/2020 | Kim et al. | |
| 2020/0192352 A1* | 6/2020 | Rastoll | G06V 20/58 |
| 2021/0114586 A1* | 4/2021 | Graefe | G08G 1/147 |
| 2021/0354689 A1* | 11/2021 | Schreiber | G01S 13/867 |
| 2022/0067400 A1* | 3/2022 | Lee | G06V 20/588 |
| 2022/0299993 A1* | 9/2022 | Fujiwara | G01S 11/06 |
| 2022/0340125 A1 | 10/2022 | Noh | |

FOREIGN PATENT DOCUMENTS

| | | |
|---|---|---|
| KR | 10-2013-0009034 | 1/2013 |
| KR | 10-2020-0028098 | 3/2020 |
| KR | 10-2022-0038857 | 3/2022 |
| KR | 10-2022-0147747 | 11/2022 |

\* cited by examiner

APPARATUS AND METHOD FOR AUTOMATIC PARKING BASED ON PARKING AREA ENVIRONMENT RECOGNITION

CROSS REFERENCE TO RELATED APPLICATIONS

This application claims the benefit of Korean Patent Applications No. 10-2022-0131282, filed Oct. 13, 2022, and No. 10-2023-0064191, filed May 18, 2023, which are hereby incorporated by reference in their entireties into this application.

BACKGROUND OF THE INVENTION

1. Technical Field

The disclosed embodiment relates to technology for automatic parking of an autonomous vehicle.

2. Description of the Related Art

Automatic parking technology is a system for searching for an available parking area using sensors installed in a vehicle and assisting with automatic parking and pulling out.

Parking assistance systems provide information about parking spaces, parking trajectories, and the like and functions such as steering control, and the like in the state in which a driver is inside a vehicle, and many vehicle manufacturers have commercialized such parking assistance systems. Automatic parking systems are technologies capable of parking by automatically controlling steering and braking without driver's intervention, and many companies are currently promoting commercialization thereof. Autonomous valet parking systems are technologies that enable vehicles themselves to search for available spaces in a parking lot and to park through autonomous driving in the state in which no driver is inside the vehicle, and development thereof is underway.

Meanwhile, there are various etiquette practices that should be observed when parking a vehicle. For example, when a target parking area is adjacent to a glass façade building or a garden, forward parking is widely recommended in order to avoid pollution from vehicle exhaust fumes.

Also, in order to prevent a door ding, which is a situation in which, when a driver or passenger gets in or out of a vehicle after parking, the door of the vehicle hits the side of an adjacent vehicle, and in order to enable the driver of the adjacent vehicle to more comfortably get in or out of his or her vehicle, it is recommended to leave more space on the side of the driver's seat of the adjacent vehicle rather than to park the vehicle in the center of the available parking space.

However, automatic parking technology of autonomous vehicles has primarily focused on safe parking so far, and the above-described parking etiquette practices that should be commonly observed have not been applied.

SUMMARY OF THE INVENTION

An object of the present disclosure is to observe common parking etiquette and improve the convenience of a driver getting in or out of a vehicle when automatic parking of an autonomous vehicle is performed.

A method for automatic parking based on recognition of a parking area environment according to an embodiment may include searching for an available parking space, determining whether reverse parking is possible by recognizing the environment of the available parking space, recognizing at least one additional vehicle located in the vicinity of the available parking space, and setting a parking destination based on the determination of whether reverse parking is possible and a result of recognition of the at least one additional vehicle.

Here, determining whether reverse parking is possible may include recognizing the property of the vicinity of the available parking space and determining that forward parking is possible when the property of the vicinity of the available parking space is a residential or commercial space.

Here, recognizing the property of the vicinity of the available parking space may comprise recognizing the property based on a semantic segmentation model that receives sensor data of a vehicle as input.

Here, recognizing the at least one additional vehicle may include recognizing the at least one additional vehicle located in the vicinity of the available parking space and recognizing the location and direction of the at least one additional vehicle.

Here, recognizing the at least one additional vehicle may comprise recognizing vehicles in front of and behind the available parking space in the case of parallel parking and recognizing vehicles parked on the left and right sides of the available parking space in the case of angle or perpendicular parking.

Here, recognizing the at least one additional vehicle may comprise recognizing the additional vehicle based on object detection technology using a three-dimensional (3D) bounding box.

Here, setting the parking destination may comprise predicting the locations of seats of drivers of a vehicle to be parked and the additional vehicle based on the directions of the vehicle to be parked and the additional vehicle and calculating the parking destination in consideration of free space on the sides of the predicted locations of the seats of the drivers.

An apparatus for automatic parking based on recognition of a parking area environment according to an embodiment includes memory in which at least one program is recorded and a processor for executing the program. The program may search for an available parking space, determine whether reverse parking is possible by recognizing the environment of the available parking space, recognize at least one additional vehicle located in the vicinity of the available parking space, and set a parking destination based on the determination of whether reverse parking is possible and a result of recognition of the at least one additional vehicle.

Here, when determining whether reverse parking is possible, the program may perform recognizing the property of the vicinity of the available parking space and determining that forward parking is possible when the property is a residential or commercial space.

Here, when recognizing the property of the vicinity of the available parking space, the program may recognize the property based on a semantic segmentation model that receives sensor data of a vehicle as input.

Here, when recognizing the at least one additional vehicle, the program may perform recognizing the at least one additional vehicle located in the vicinity of the available parking space and recognizing the location and direction of the at least one additional vehicle.

Here, when recognizing the at least one additional vehicle, the program may recognize vehicles in front of and behind the available parking space in the case of parallel parking and recognize vehicles parked on the left and right sides of the available parking space in the case of angle or perpendicular parking.

Here, when recognizing the at least one additional vehicle, the program may recognize the additional vehicle based on object detection technology using a 3D bounding box.

Here, when setting the parking destination, the program may predict the locations of seats of drivers of a vehicle to be parked and the additional vehicle based on the parking directions of the vehicle to be parked and the additional vehicle and calculate the parking destination in consideration of free space on the sides of the predicted locations of the seats of the drivers.

A method for automatic parking based on recognition of a parking area environment according to an embodiment may include searching for an available parking space, recognizing the property of the surrounding environment of the available parking space, determining whether reverse parking is possible depending on whether the property of the surrounding environment is a residential or commercial space, recognizing at least one additional vehicle located in the vicinity of the available parking space, recognizing the location and direction of the recognized at least one additional vehicle, predicting the locations of seats of drivers of a vehicle to be parked and the additional vehicle based on whether reverse parking is possible and the directions of the vehicle to be parked and the additional vehicle, and calculating a parking destination in consideration of free space on the sides of the predicted locations of the seats of the drivers.

Here, recognizing the property of the surrounding environment of the available parking space may comprise recognizing the property based on a sematic segmentation model that receives sensor data of a vehicle as input.

Here, recognizing the at least one additional vehicle may comprise recognizing the additional vehicle based on object detection technology using a 3D bounding box.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Figure 1:
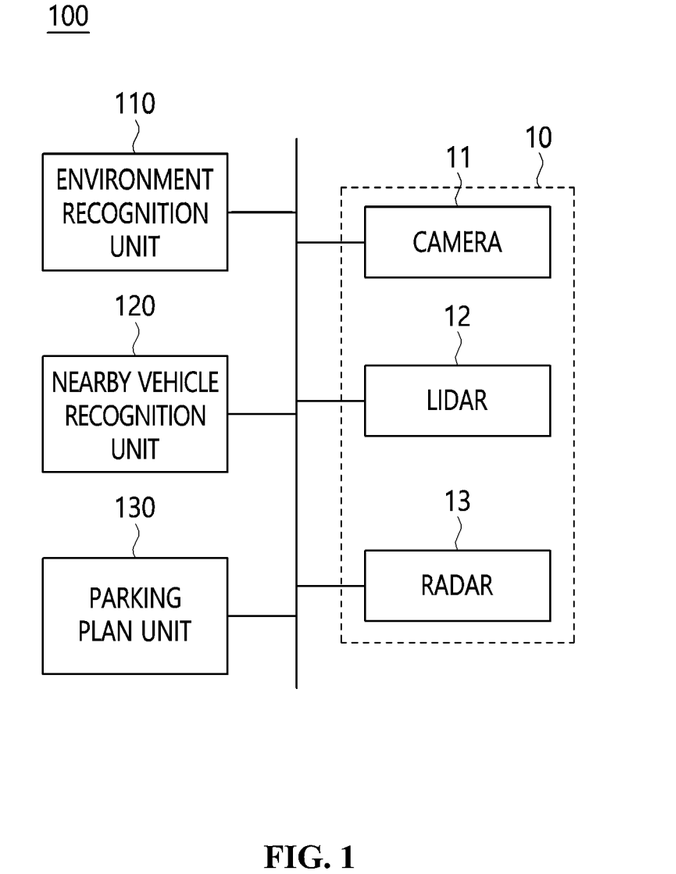
FIG. 1 is a schematic block diagram of an apparatus for automatic parking based on recognition of a parking area environment according to an embodiment.
Figure 2:
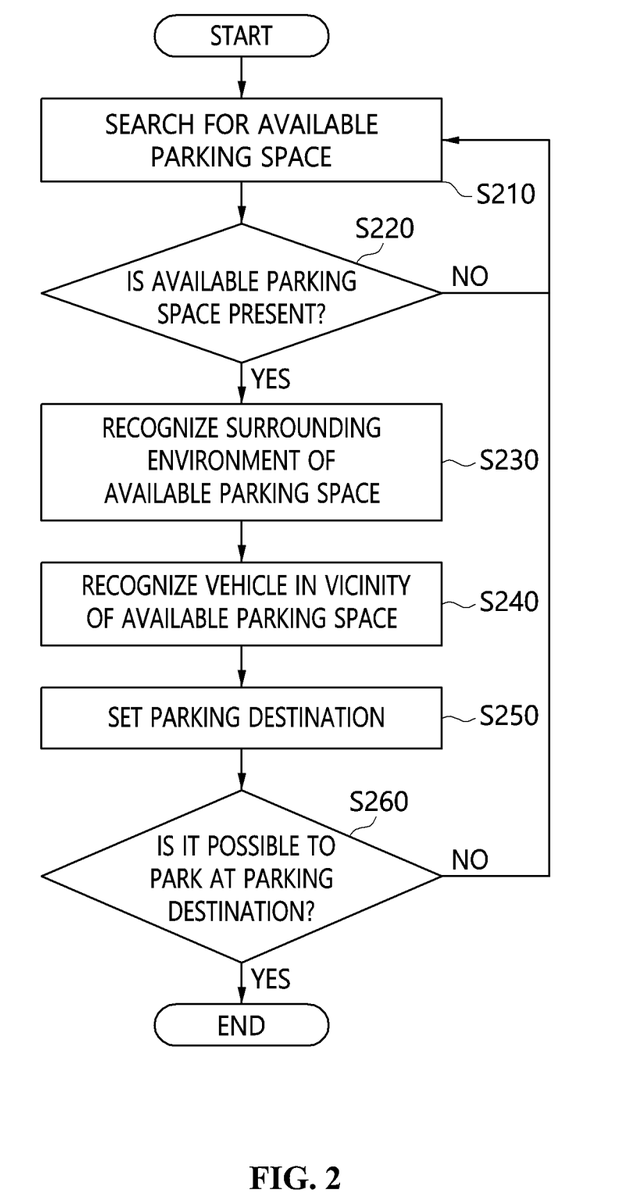
FIG. 2 is a flowchart for explaining a method for automatic parking based on recognition of a parking area environment according to an embodiment.

FIG. 1 is a schematic block diagram of an apparatus for automatic parking based on recognition of a parking area environment according to an embodiment, and FIG. 2 is a flowchart for explaining a method for automatic parking based on recognition of a parking area environment according to an embodiment.

Referring to FIG. 1, the apparatus 100 for automatic parking based on recognition of a parking area environment according to an embodiment is installed in an autonomous vehicle, thereby performing operation of automatically parking and pulling out the vehicle.

Here, a sensor unit 10 for acquiring information about surroundings may be installed in the autonomous vehicle. The sensor unit 10 may include, for example, a camera 11, a Light Detection and Ranging (LiDAR) device 12, and radar 13.

Here, the camera 11 and the LiDAR device 12 may acquire images of the surrounding environment of the vehicle, and the radar 13 may acquire the locations of objects in the surrounding environment of the vehicle and the distances to the objects.

The apparatus 100 for automatic parking based on recognition of a parking area environment acquires the surrounding environment information using the sensor unit 10 installed in the autonomous vehicle and performs automatic parking based on the acquired information.

Specifically, the apparatus 100 for automatic parking based on recognition of a parking area environment may include an environment recognition unit 110, a nearby vehicle recognition unit 120, and a parking plan unit 130.

The environment recognition unit 110 recognizes the surrounding environment of the vehicle in order to perform autonomous driving or automatic parking. Particularly, parking requires more precise recognition than when general road driving is performed.

According to an embodiment, the environment recognition unit 110 searches for an available parking space and recognizes the environment of the found available parking space, thereby determining whether reverse parking is possible.

That is, referring to FIG. 2, the environment recognition unit 110 searches for a parking space based on sensor data sensed by the sensor unit 10 when the vehicle arrives at a destination at step S210.

When it is determined at step S220 that an available parking space is present as the result of the search performed at step S210, the environment recognition unit 110 recognizes the surrounding environment of the available parking space at step S230. This will be described in detail later with reference to FIGS. 3 to 6.

Subsequently, the nearby vehicle recognition unit 120 recognizes at least one additional vehicle located in the vicinity of the available parking space at step S240. This will be described in detail later with reference to FIGS. 7 to 12.

Subsequently, the parking plan unit 130 sets a parking destination at step S250 based on the determination of whether reverse parking is possible, which is output from the environment recognition unit 110, and on the result of recognition of the at least one additional vehicle, which is output from the nearby vehicle recognition unit 120. This will be described in detail later with reference to FIGS. 13 to 15.

Subsequently, when it is impossible to park at the set destination, the parking plan unit 130 goes to step S210.

Figure 3:
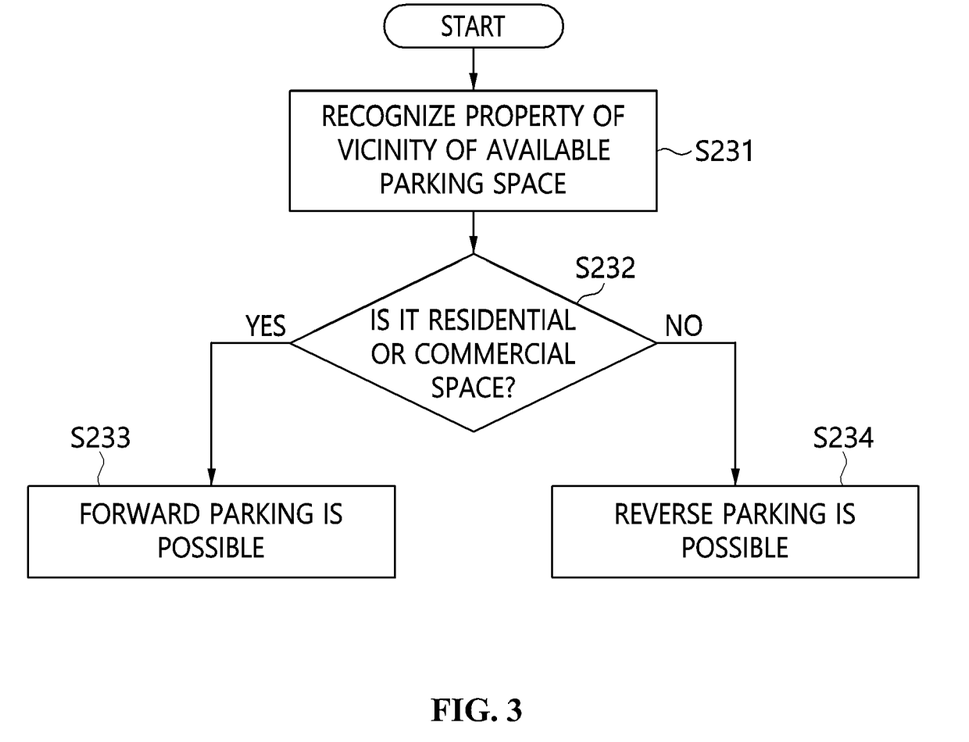
FIG. 3 is a flowchart for explaining a step for recognizing a surrounding environment of an available parking space according to an embodiment.
Figure 4:
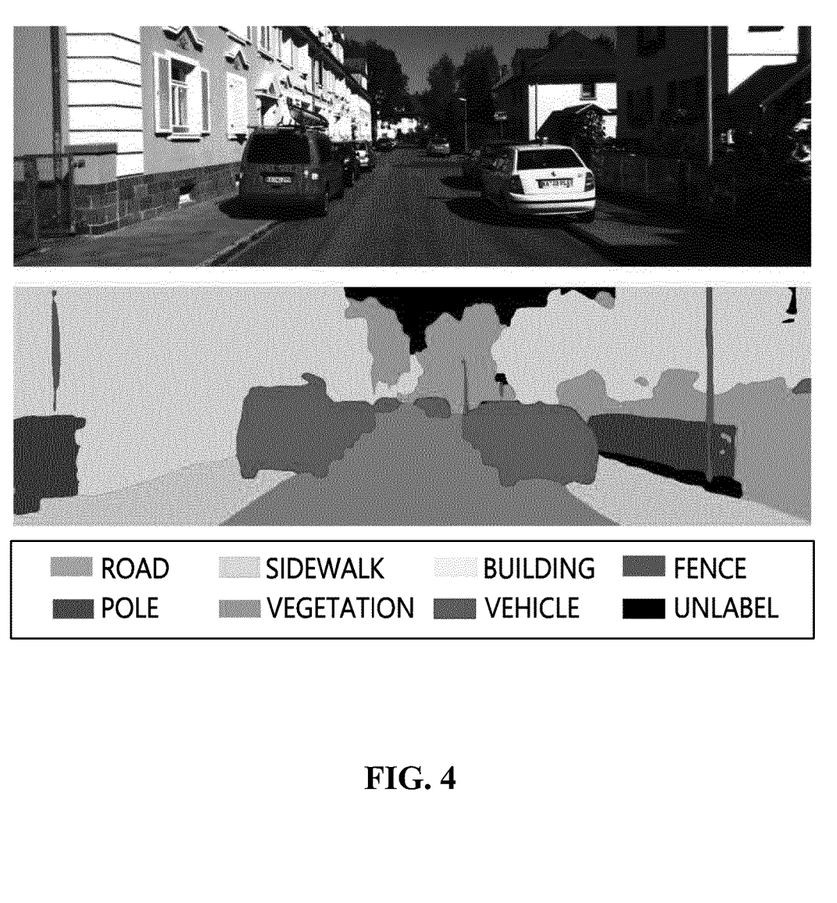
FIG. 4 is an exemplary view of environment recognition based on sematic segmentation.
Figure 5:
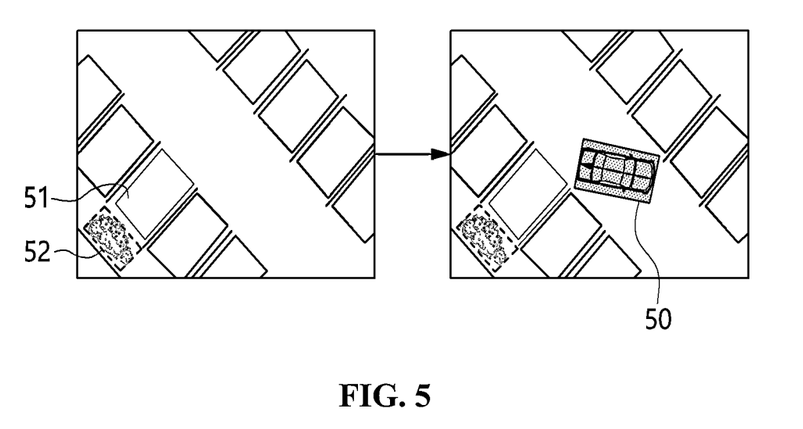
FIG. 5 is an exemplary view of forward parking according to an embodiment.
Figure 6:
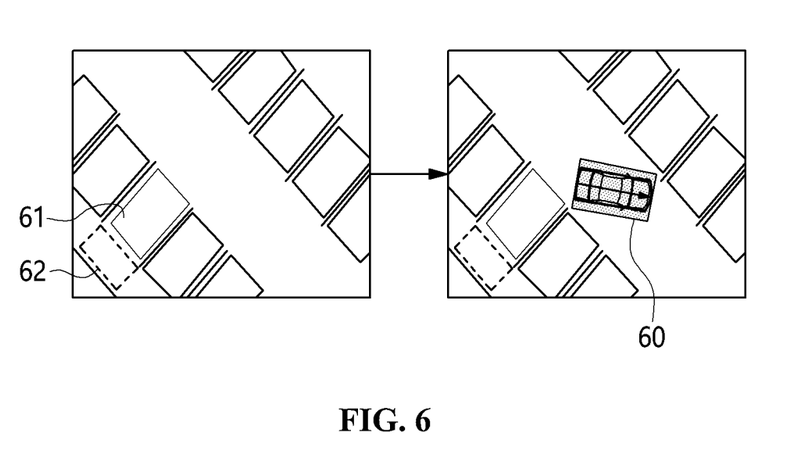
FIG. 6 is an exemplary view of reverse parking according to an embodiment.

FIG. 3 is a flowchart for explaining a step for recognizing a surrounding environment of an available parking space according to an embodiment, FIG. 4 is an exemplary view of environment recognition based on sematic segmentation, FIG. 5 is an exemplary view of forward parking according to an embodiment, and FIG. 6 is an exemplary view of reverse parking according to an embodiment.

Referring to FIG. 3, the environment recognition unit 110 recognizes the property of the vicinity of an available parking space at step S231.

Here, the environment recognition unit 110 recognizes each of objects in the vicinity of the available parking space based on a sematic segmentation model that receives data acquired from the camera 11 or LiDAR device 12 installed in the vehicle as input, as illustrated in FIG. 4.

Here, sematic segmentation is technology for classifying the input of the sensor unit 10 into defined classes in units of pixels, and may be used to predict the property of a specific area.

The environment recognition unit 110 determines that forward parking is possible at step S233 when the property of the vicinity of the available parking space, which is recognized at step S231, is a residential or commercial space at step S232. For example, when the vicinity of the available parking space 51 is a residential or commercial space including a flower bed 52 or glass material, as illustrated in FIG. 5, it may be determined that forward parking 50 is possible.

Conversely, when the property of the vicinity of the available parking space 61, which is recognized at step S231, is not a residential or commercial space at step S232, the environment recognition unit 110 determines that reverse parking 60 is possible at step S234. For example, when the vicinity 62 of the available parking space is neither residential nor commercial space, it may be determined that reverse parking is possible, as illustrated in FIG. 6.

Figure 7:
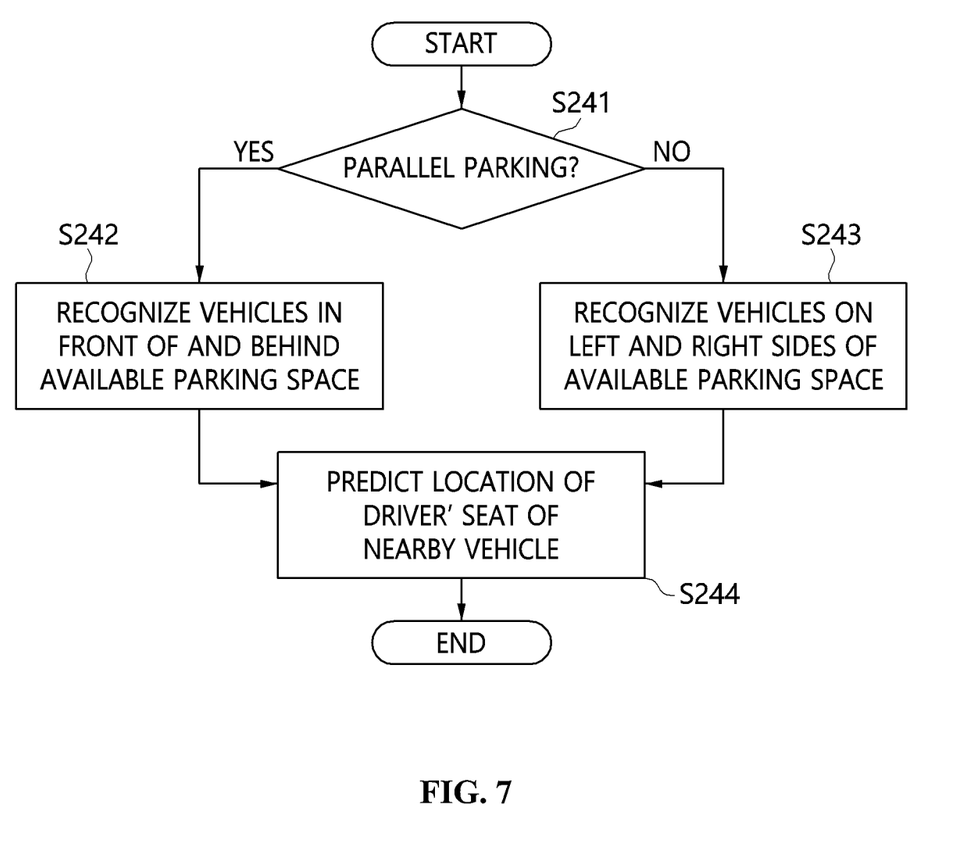
FIG. 7 is a flowchart for explaining a step for recognizing other vehicles according to an embodiment.
Figure 8:
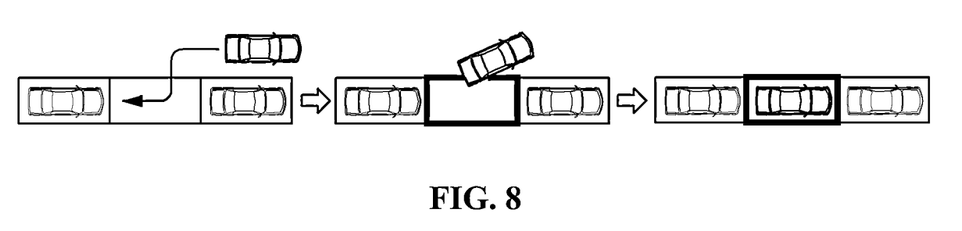
FIG. 8 is an exemplary view of automatic parallel parking.
Figure 9:
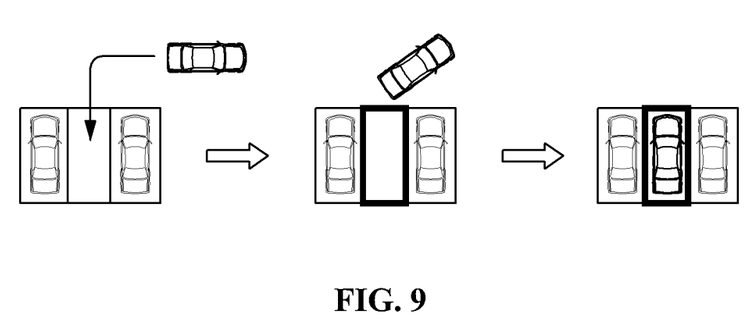
FIG. 9 is an exemplary view of automatic perpendicular parking.
Figure 10:
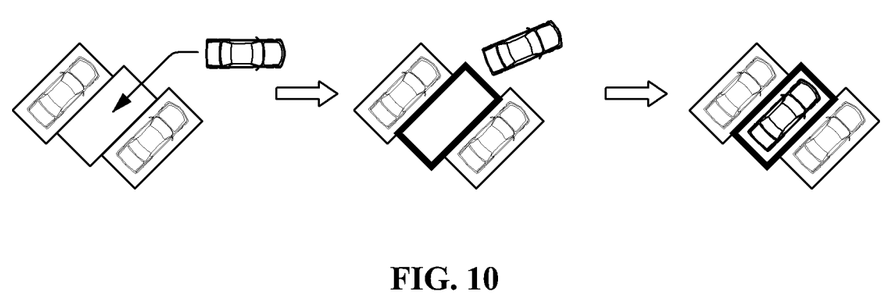
FIG. 10 is an exemplary view of automatic angle parking.
Figure 11:
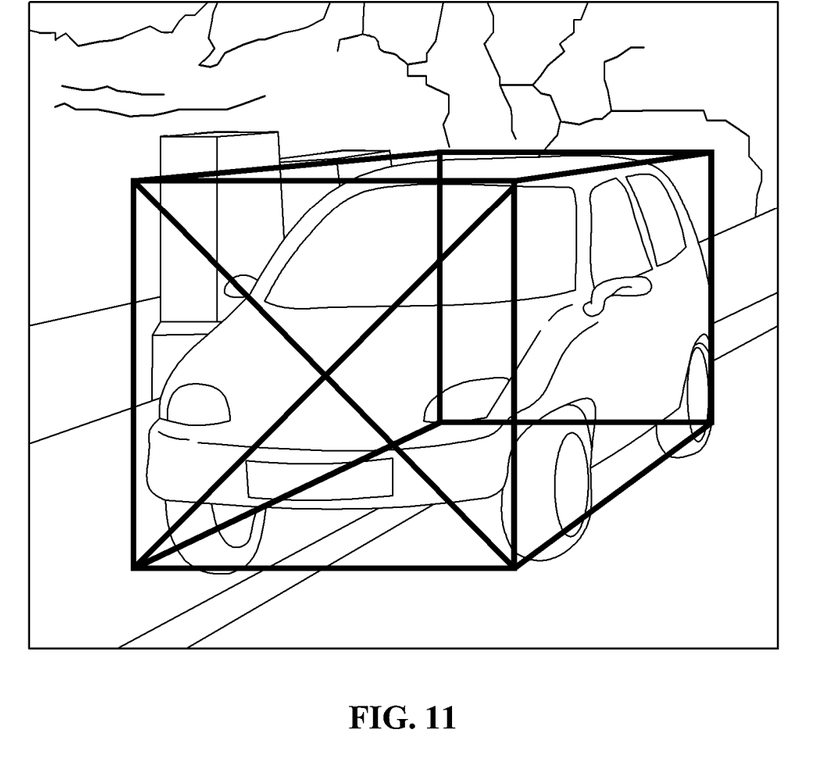
FIG. 11 is an exemplary view of object detection using a three-dimensional (3D) bounding box.
Figure 12:
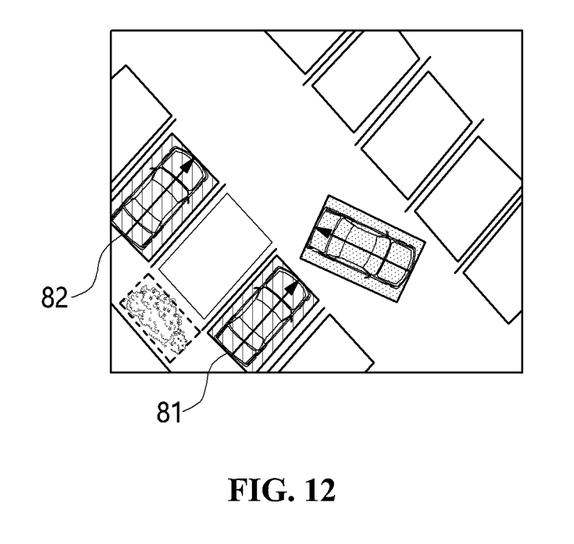
FIG. 12 is an exemplary view of prediction of the location and direction of an additional vehicle according to an embodiment.

FIG. 7 is a flowchart for explaining a step for recognizing other vehicles according to an embodiment, FIG. 8 is an exemplary view of automatic parallel parking, FIG. 9 is an exemplary view of automatic perpendicular parking, FIG. 10 is an exemplary view of automatic angle parking, FIG. 11 is an exemplary view of object detection using a 3D bounding box, and FIG. 12 is an exemplary view of prediction of the locations and directions of other vehicles according to an embodiment.

Referring to FIG. 7, the nearby vehicle recognition unit 120 recognizes at least one additional vehicle located in the vicinity of an available parking space at steps S241 to S243.

Here, when parallel parking is possible in the available parking space at step S241, as illustrated in FIG. 8, the nearby vehicle recognition unit 120 recognizes other vehicles located in front of and behind the available parking space at step S242.

Conversely, when it is determined at step S241 that perpendicular parking is possible in the available parking space, as illustrated in FIG. 9 or that angle parking is possible in the available parking space, as illustrated in FIG. 10, the nearby vehicle recognition unit 120 recognizes other vehicles located on the left and right sides of the available parking space at step S243.

Here, the nearby vehicle recognition unit 120 recognizes other vehicles located in the vicinity of the available parking space based on object detection technology using a 3D bounding box, as illustrated in FIG. 11.

Here, object detection is technology for searching for a target object in the form of 3D box using the input sensor, and aims to discover both the location and direction of the object in the 3D space.

Subsequently, the nearby vehicle recognition unit 120 predicts the location and direction of the at least one additional vehicle at step S244. For example, the locations and parking directions of other vehicles 81 and 82 located on the left and right sides of the available parking space for perpendicular parking are recognized, as illustrated in FIG. 12.

Figure 13:
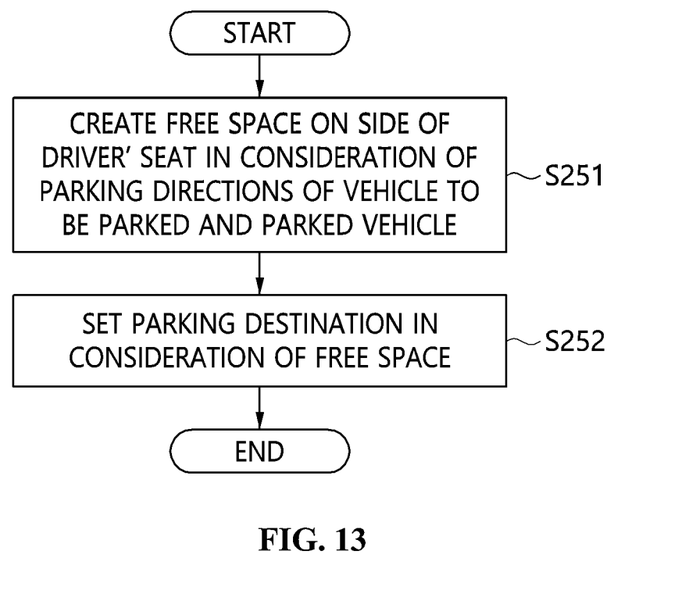
FIG. 13 is a flowchart for explaining a step for recognizing other vehicles according to an embodiment.
Figure 14:
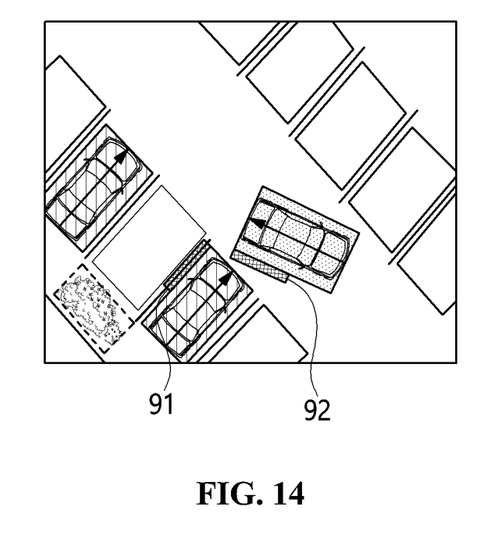
FIG. 14 is an exemplary view of creation of free space according to an embodiment.
Figure 15:
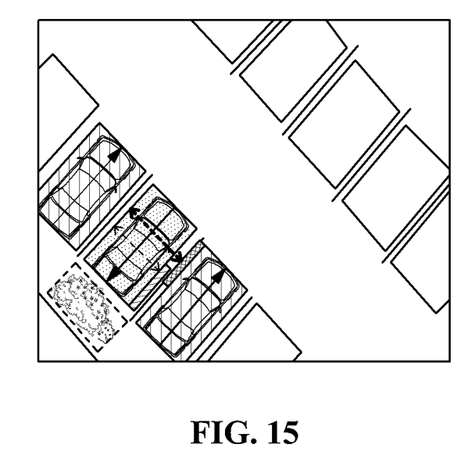
FIG. 15 is an exemplary view of setting of a parking destination in which free space is taken into account according to an embodiment.

FIG. 13 is a flowchart for explaining a step for recognizing other vehicles according to an embodiment, FIG. 14 is an exemplary view of creation of free space according to an embodiment, and FIG. 15 is an exemplary view of setting of a parking destination in which free space is taken into account according to an embodiment.

Referring to FIG. 13, the parking plan unit 130 creates free space in consideration of the parking direction of the vehicle to be parked and the parking direction of at least one additional vehicle at step S251.

That is, based on the parking direction of the vehicle to be parked, which is determined at step S230, and the parking direction of the at least one additional vehicle parked in the vicinity thereof, the locations of the driver's seats in the respective vehicles are predicted. For example, the driver's seat may be on the left side in South Korea.

Subsequently, the parking plan unit 130 creates free space based on the predicted locations of the driver's seats. For example, free space 91 and free space 92 are virtually created on the left side of the driver's seat of the parked vehicle and on the left side of the driver's seat of the vehicle to be parked, as illustrated in FIG. 14.

Accordingly, the vehicle to be parked is induced to have more space on the side of the predicted location of the driver's seat such that the driver of the vehicle to be parked and the driver of the parked vehicle easily get in or out of their vehicles.

Subsequently, the parking plan unit 130 sets the final parking destination at step S252 in consideration of the virtually created free space. That is, the parking destination is calculated in the state in which the additional virtual free space is secured in the direction of the predicted location of the driver's seat, as illustrated in FIG. 15. Consequently, the vehicle to be parked is induced to be parked at the location at which the distance to the driver's seat of the adjacent vehicle is greater than when the vehicle is parked in the center of the parking space.

Figure 16:
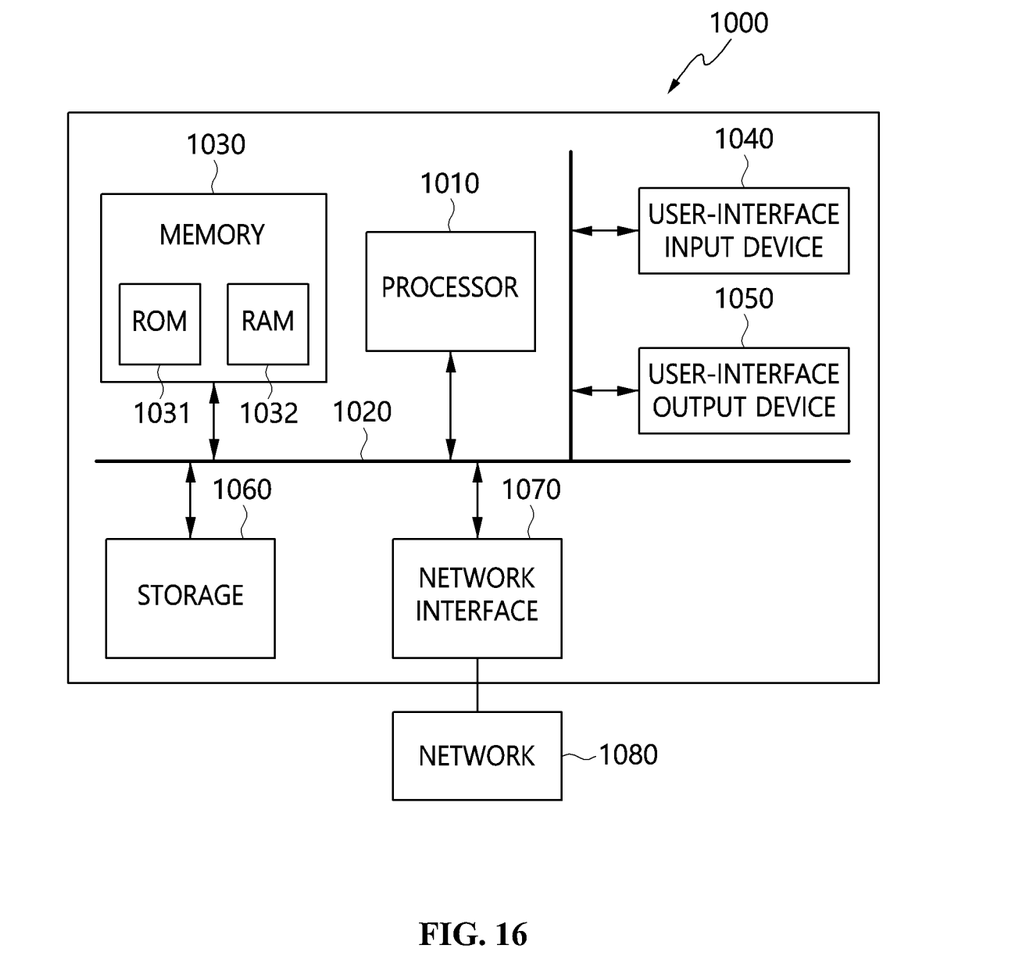
FIG. 16 is a view illustrating a computer system configuration according to an embodiment.

FIG. 16 is a view illustrating a computer system configuration according to an embodiment.

The apparatus according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

The disclosed embodiment may observe common parking etiquette and improve the convenience of a driver getting in or out of a vehicle when automatic parking of an autonomous vehicle is performed.

Although embodiments of the present disclosure have been described with reference to the accompanying drawings, those skilled in the art will appreciate that the present disclosure may be practiced in other specific forms without changing the technical spirit or essential features of the present disclosure. Therefore, the embodiments described above are illustrative in all aspects and should not be understood as limiting the present disclosure.

What is claimed is:

1. A method for automatic parking based on recognition of a parking area environment, comprising:
searching for an available parking space;
determining whether reverse parking is possible by recognizing an environment of the available parking space;
recognizing at least one additional vehicle located in a vicinity of the available parking space; and
setting a parking destination based on a determination of whether reverse parking is possible and a result of recognition of the at least one additional vehicle, wherein
recognizing the at least one additional vehicle includes recognizing the additional vehicle located in the vicinity of the available parking space and recognizing a location and direction of the additional vehicle, and
setting the parking destination includes predicting a location of a driver's seat of the additional vehicle based on the recognized direction of the additional vehicle and calculating the parking destination in consideration of free space on a side of the predicted location of the driver's seat of the additional vehicle.

2. The method of claim 1, wherein determining whether the reverse parking is possible includes
recognizing a property of the vicinity of the available parking space; and
determining that forward parking is possible when the property is a residential or commercial space.

3. The method of claim 2, wherein recognizing the property of the vicinity of the available parking space comprises recognizing the property based on a semantic segmentation model that receives sensor data of a vehicle as input.

4. The method of claim 1, wherein recognizing the at least one additional vehicle comprises recognizing vehicles in front of and behind the available parking space in a case of parallel parking and recognizing vehicles parked on left and right sides of the available parking space in a case of angle or perpendicular parking.

5. The method of claim 1, wherein recognizing the at least one additional vehicle comprises recognizing the additional vehicle based on object detection technology using a three-dimensional (3D) bounding box.

6. The method of claim 1, wherein setting the parking destination further includes predicting a location of a driver's seat of a vehicle to be parked based on a direction of the vehicle to be parked, and
calculating the parking destination includes calculating the parking destination in consideration of free space on a side of the predicted location of the driver's seat of the vehicle to be parked.

7. An apparatus for automatic parking based on recognition of a parking area environment, comprising:
memory in which at least one program is recorded; and
a processor for executing the program,
wherein the program searches for an available parking space, determines whether reverse parking is possible by recognizing an environment of the available parking space, recognizes at least one additional vehicle located in a vicinity of the available parking space, and sets a parking destination based on a determination of whether reverse parking is possible and a result of recognition of the at least one additional vehicle, wherein
when recognizing the at least one additional vehicle, the program performs recognizing the additional vehicle located in the vicinity of the available parking space and recognizing a location and direction of the additional vehicle, and when setting the parking destination, the program predicts a location of a driver's seat of the additional vehicle based on the recognized direction of the additional vehicle and calculates the parking destination in consideration of free space on a side of the predicted location of the driver's seat of the additional vehicle.

8. The apparatus of claim 7, wherein, when determining whether reverse parking is possible, the program performs
   recognizing a property of the vicinity of the available parking space; and
   determining that forward parking is possible when the property is a residential or commercial space.

9. The apparatus of claim 8, wherein, when recognizing the property of the vicinity of the available parking space, the program recognizes the property based on a semantic segmentation model that receives sensor data of a vehicle as input.

10. The apparatus of claim 7, wherein, when recognizing the at least one additional vehicle, the program recognizes vehicles in front of and behind the available parking space in a case of parallel parking and recognizes vehicles parked on left and right sides of the available parking space in a case of angle or perpendicular parking.

11. The apparatus of claim 7, wherein, when recognizing the at least one additional vehicle, the program recognizes the additional vehicle based on object detection technology using a three-dimensional (3D) bounding box.

12. The apparatus of claim 7, wherein, when setting the parking destination, the program further predicts a location of a driver's seat of a vehicle to be parked based on parking directions of the vehicle to be parked, and when calculating the parking destination, the program calculates the parking destination in consideration of free space on a side of the predicted location of the driver's seat of the vehicle to be parked.

13. A method for automatic parking based on recognition of a parking area environment, comprising:
   searching for an available parking space;
   recognizing a property of a surrounding environment of the available parking space;
   determining whether reverse parking is possible depending on whether the property of the surrounding environment is a residential or commercial space;
   recognizing at least one additional vehicle located in a vicinity of the available parking space;
   recognizing a location and direction of the recognized at least one additional vehicle;
   predicting locations of a driver's seat of the additional vehicle based on the direction of the additional vehicle; and
   calculating a parking destination in consideration of free space on a side of the predicted locations of the driver's seat of the additional vehicle.

14. The method of claim 13, wherein recognizing the property of the surrounding environment of the available parking space comprises recognizing the property based on a sematic segmentation model that receives sensor data of a vehicle as input.

15. The method of claim 13, wherein recognizing the at least one additional vehicle comprises recognizing the additional vehicle based on object detection technology using a three-dimensional (3D) bounding box.

* * * * *